July 30, 1968  R. H. GREGORY  3,395,026
ADDITIVE HICKORY ESSENCE MATERIAL AND SMOKE PRODUCING FUEL
Filed June 17, 1965
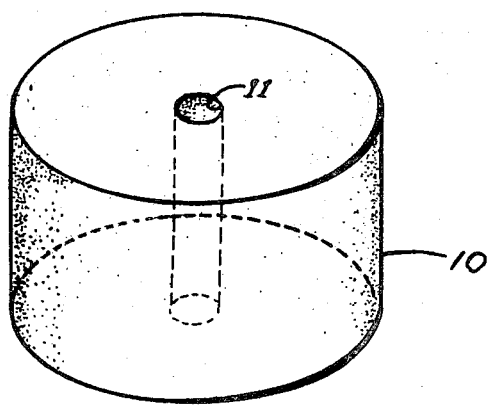
RICHARD H. GREGORY INVENTOR.
BY Roger L. Martin

United States Patent Office 3,395,026
Patented July 30, 1968

3,395,026
ADDITIVE HICKORY ESSENCE MATERIAL
AND SMOKE PRODUCING FUEL
Richard H. Gregory, 919 Brookdale Place,
Decatur, Ga. 30033
Filed June 17, 1965, Ser. No. 464,634
3 Claims. (Cl. 99—229)

ABSTRACT OF THE DISCLOSURE

Hickory essence material is recovered from fresh cut hickory wood by leaching particles of the phloem component with water at temperatures less than 90 degrees F. and preferably below 80 degrees F. The extract is unstable and susceptible to the loss of the essence material if retained at room temperatures for prolonged periods but may be rendered stable by freezing or by storing in hermetically sealed containers. One use of the extract is in production of a smoke producing fuel additive. In such cases the phloem particles are preferably only saturated with water and the extract recovered by pressing the saturated material. This is then used to impregnate a particulate mass of fresh untreated green hickory fibrous material and fine granular sand and which may also contain a binder such as starch. The impregnated mass is then compressed into a briquette form and dryed at temperatures below 90 degrees F. With proper proportions the resulting briquette is nonflammable and useful as a noburning, smoke producing fuel additive for use in cooking meats and the like.

This invention relates to essence material derived from hickory wood and to a nonflammable but yet combustible hickory smoke producing fuel additive that contains such essence material, the fuel additive being useful in preparing hickory smoked meat products.

Hickory smoked meat products such as hickory smoked ham, beef, fish and poultry are available commercially and the better commercial products are prepared by treating the meat with smoke derived by the flameless or nonflammable combustion of water soaked green hickory logs. Such meat products have a full-bodied hickory aroma and flavor characteristic which amateur and professional chefs and cooks have unsuccessfully attempted to reproduce for many years through the use of charcoal derived from hickory woods and through the use of old hickory chips as additives to charcoal burners and barbecue pits. Such attempts, although productive, of cooked meat products evidencing the use of hickory woods in their cooking treatments, nevertheless fail to produce the full-bodied hickory aroma and flavor characteristics that are evident in the better commercial products.

It has been discovered that the essence material resident in green hickory woods and which imparts the full-bodied hickory flavor and aroma to the better hickory smoked commercial meat products contains volatile flavor and aroma factors that are lost in the preparation of hickory charcoal and that such factors are also lost from hickory woods through mere aging of the woods after their severance from the ground. It has also been discovered that such essence materials can be extracted in a relatively concentrated aqueous form from fresh cut hickory woods by relatively simple procedures that avoid loss of the desired volatile flavor and aroma factors and furthermore that the extracted essence material can be effectively incorporated in a product where the volatile factors are stable over long periods. The product furthermore, may be added to charcoal burners and the like to produce a smoke that imparts the full-bodied hickory flavor and aroma to meats smoked thereby and which heretofore have been characteristics associated only with the better commercial meat products.

One object of the invention is to provide a product containing hickory essence material and which may be userd in preparing hickory smoked meats having full-bodied hickory aroma and flavor characteristics that are normally derived by smoking the meats with smoke derived through the flameless combustion of water soaked green hickory logs.

Yet another object is to provide a nonflammable yet combustible smoke producing product which may be used as an additive to fuels consumed in charcoal burners, barbecue pits and the like and which provides large volumes of hickory smoke.

A general object is to provide a process for extracting essence material from hickory woods.

One object is to provide a product that contains the highly volatile factors of hickory essence materials in a form where they are stable over long periods.

Yet another object is to provide an extraction process that captures the volatile flavor and aroma factors of the essence material of hickory woods and to which the full-bodied flavor and aroma characteristics of the better hickory smoked meat products are attributed.

Yet another object is to provide a concentrated form of such essence material and which can be used in preparing smoke producing products usable commercially and privately in the production of hickory smoked meats.

A still further object is to provide a simple process for extracting such essence material from hickory woods.

The novel features which are believed to be characteristic of this invention are set forth with particularity in the appended claims. The invention, itself, however, both as to its organization and method of operation, together with further objects and advantages thereof, may best be understood by reference to the following description taken in connection with the accompanying drawing, wherein there is shown a perspective view of a briquette embodying certain features of the invention and which has been prepared in accordance with the process disclosure contained hereinafter.

It has been discovered that the essence material which imparts the desired hickory flavor and aroma to hickory smoked meat products is concentrated in the phloem component of fresh cut hickory wood and that the volatile flavor and aroma constituents or factors of the essence material and to which the full-bodied characteristic of the better smoked meat products are attributed may be extracted from the component under certain conditions by simple aqueous treatments.

The feeder roots of hickory trees are principal sources of the phloem component of the hickory woods and may be used as source materials for preparing the extract of the invention. Yet another source of the phloem component is in the trunk and branch stock of the tree where it is present as a layer interposed between the bark and cambium component of the stock.

Although the essence material is concentrated in the phloem, it has been found that the volatile factors necessary to impart the full-bodied flavor and aroma characteristics referred to heretofore tend to dissipate from the wood after the wood has been severed from the ground and thus severed from its food source. In this respect it has been observed that the phloem component of severed woods should be subjected to the extraction process disclosed hereinafter within a period of about thirty days after the wood has been severed from the food source and furthermore that the untreated fibrous material in which the essence material can be in effect stored in a stable form as will become evident hereinafter should also be derived from fresh cut hickory woods. Thus the phloem component from cut logs and the root stock should be treated shortly after the logs have been cut or the roots removed from the ground. Because of this it should be understood that the expression "green wood," "fresh cut wood" and the like expressions used herein have reference to woods that have been severed from their ground source of food for a period of less than about thirty days.

Basically, the process of recovering the essence material from the hickory woods involves the use of green hickory woods as a source of phloem component and further involves treating a mass of particles of the phloem component with water to dissolve the essence material out of the base structure of the phloem particles, the treatment being in a system that is maintained at a temperature below at least 90° Fahrenheit and which is preferably below 80° Fahrenheit.

The hickory phloem component subjected to the leach process should be suitably comminuted and thus broken up into small particles to facilitate the water treatment. In the case of root stock, the stock may be broken up into small particles by any suitable equipment, conventional shredders used by the paper industry for preparing the woods for digestion purposes being suitable equipment for this purpose as well as commercial pulverizers or grinders and other types of equipment adapted to break up the wood into more uniform and less lengthy particulate sizes than the shredders. The finer the particles of phloem subject to the extraction process, the more rapidly is the extraction accomplished and although the particle sizes of the phloem are not critical, it is preferred that the particles have a size comparable to normal coarse cross-cut sawdust, typical grindings having an average particle size of less than about one-eighth of an inch.

Logs cut from the trunk or branch stock of trees should first have the bark removed so as to expose the underlying layer of phloem. The phloem component in these cases can then be removed from the outside of the cambium layer in any suitable manner and either pulverized during the process of removal or thereafter as by use of equipment previously mentioned as suitable for the root stock. One method which has been found suitable for removing the phloem layer and simultaneously producing particles of an acceptable size involves the use of a plurality of disc type cross-cut blades of the same size. The blades may be mounted adjacent one another on a common shaft and the phloem layer may be removed from the outside of the cambium layer and simultaneously broken up into particles by bringing the surface of the de-barked log into contact with the blades.

Experience has shown that although the volatile factors tend to gradually become lost from the logs and that the loss is excessive after the wood has been severed from its source for a period in excess of about thirty days, difficulty in pulverizing the phloem is sometimes encountered when the comminute process is carried out immediately after severance of the wood from its food source. In such cases it has been found that the comminution of the phloem produces a gummy mass which although rich in the desired essence material nevertheless tends to interfere with the efficient operation of the pulverizing equipment and the obtainment of discrete particles that can be most conveniently handled and subjected to the aqueous treatments. In such cases it has been found that if the severed log or root is left exposed to the air for about a period of a week before being broken up into the smaller particles, that this problem is minimized and the phloem component can be more readily broken up into small particles without objectionably interfering with the equipment used for the comminuting step.

The comminuted material subjected to the aqueous treatment is preferably free from appreciable amounts of other fibrous stock of the tree so as to avoid loss of the desired essence material through absorption in the insoluble residue resulting from the aqueous treatment. The main thing here is for efficiency reasons to avoid for example the dilution of the comminuted phloem with large quantities of xylem particles or other absorbent particles that can only serve to absorb the desired extract without contributing appreciably to the source of essence material being extracted.

In accord with the extraction process the essence material is dissolved from a mass of the phloem particles by treating the mass with water. This may be accomplished by first intimately mixing the particles with a small amount of distilled water or with ordinary tap water so long as the latter is not overburdened with sulphur or other constituents that adversely influence the quality of the extract.

The amount of water employed for leaching the essence material from the mass of particulate phloem may vary in accord with the concentration of essence material desired in the aqueous extract. Preferably the amount of water employed is only sufficient to saturate the fibrous structure of the particles as by just covering the mass of particles with the water in a suitable vessel. In a typical operation only the amount of water that can be absorbed by the fibrous particles is used, one part water by volume being normally adequate to thoroughly impregnate the fibrous structure of an equal volume (bulk) of a loose mass of the phloem particles. Lesser or greater amounts of water may be used in the process but the mixture usually becomes too thick for efficient recovery of the residual extract from the fibers when the amount of water is decreased to about 0.5 part per part (bulk) of phloem particles. As much as four parts (volume) of water per part (bulk volume) of phloem may be used in the extraction process and even diluter systems may be used where an extract having a lesser concentration of essence material is desired. When the aqueous extract is to be used in preparing the briquettes referred to hereinafter and for the intended use thereof, the amount of water employed in the process is preferably between about .5 and about 1.5 parts (volume) per part (bulk volume) of phloem so as to provide the best results when the briquettes are used in smoking meats, etc.

Once the leach system is established, the particles are allowed to soak in the water until they have been thoroughly impregnated with the water and the essence material has been dissolved in the leach component of the aqueous system. This is usually accomplished in a matter of about from one-half hour to about two hours depending primarily upon the particle size and the amount of water involved in leach system. With a larger particle size, a longer steeping period is usually necessary and of course a more dilute system promotes more rapid extraction but nevertheless provides a resulting extract of lesser concentration in essence material.

Throughout the steeping step the mass of particles may be gently stirred or kneaded if desired so as to bring the essence content of the particles and the leach liquid into intimate contact, although in most cases this is found to be unnecessary.

After the phloem particles have been sufficiently soaked in and exposed to the aqueous component of the system, the essence rich aqueous extract resulting from the extraction step is separated from the undissolved phloem residue. This can be accomplished by pressing the residual mass of particles to express and thus squeeze out as much of the liquor from the water insoluble components of the system as is practical. In practice, presses such as those used in preparing sweet cider by pressing apples, may be employed for expressing the residual extract from the insoluble pulp, although other types of equipment including roll-type presses may be readily used as it is evident to those skilled in the art. In especially dilute systems other filtering procedures including decantation procedures may precede the pressing of the insoluble pulp.

One of the important things that has been ascertained in accord with the invention is that the components of the system established for the extraction process must be maintained at a temperature which is less than 90° Fahrenheit during the leaching operation or otherwise certain of the more involatile flavor and aroma components of the essence material and which materially contribute to the full-bodied flavor and aroma characteristics in hickory smoked meat products produced through use of the extracted essence material are volatilized and lost from the system. In the preferred practice of the extraction process, the best results have been realized when the aqueous system involved in the solubilization procedure is maintained at temperature below about 80° Fahrenheit as for example at about 60° Fahrenheit.

The essence rich aqueous extract may be used in preparing the briquettes referred to hereinafter or may be used as an intermediate in the forming of other products useful in the treatment of foods. However, one added thing has been ascertained about the essence rich extract obtained by the process described, i.e. that the volatile factors which impart the desired full-bodied flavor and aroma characteristics to the smoked foods may also become lost from the aqueous extract if the extract is left exposed to atmospheric conditions for prolonged periods even though the temperature is maintained below those indicated. For example, in forming the briquettes referred to hereinafter it has been fond that an extract prepared about twenty-four hours before being used in the preparation of the briquettes fails to produce the desired full-bodied flavor upon subsequent use as a fuel additive. On the other hand, use of extract prepared the same day as that it is used in the preparation of the briquettes overcomes this problem. The loss referred to may be avoided by hermetically sealing the freshly prepared extract in a suitable container so as to prevent the volatilization of the elusive factors from the prepared extract and this may be desired for some uses of the extract. However, in practice this is sometimes impractical where the briquettes are prepared on the premises used for extracting the essence materials from the phloem, and thus in preparing the burner additives one will normally use a fresh extract, that is one which is not more than about twenty-four hours old and preferably one which has not been prepared for more than about sixteen hours. Preservation of the extract may be also accomplished by freezing the extract to a solid state. Frozen extract may be stored for several weeks, thawed out and then used in the preparation of the fuel additives mentioned hereinafter.

One aspect of the invention is based on the discovery that the volatile factors (which it should be understood have not been identified chemically) are apparently captured and rendered stable against loss when associated in a compacted mass with particles of a fibrous material that is derived from fresh cut or green hickory woods. Such fibrous material being, except for its particulate structure, essentially the same as found in its native habitat and being untreated for the removal of any of its constituents is referred to herein as "untreated" so as to distinguish it from the insoluble fibrous residues which result from the extraction process.

The essence material of the extract in accord with this aspect of the invention may be incorporated in a compressed structure having an untreated green hickory fibrous component and thereafter used as a hickory smoke producing fuel additive for charcoal burners, barbecue pits and the like. Experience has shown that in such cases the volatile factors are apparently stabilized through association with the untreated fibrous component and that the full-bodied aroma and flavor characteristics heretofore mentioned may be realized during the subsequent use of the fuel additive. Fuel additives of this type have been prepared from fresh essence material and found to impart all the full-bodied characteristics to meats even after storage for better than a year.

The fibrous component for the compact masses is secured from green hickory woods and should be ground to a size suitable for compression into the desired form, typical particular sizes being usually less than one-eighth of an inch. A flame retardant should also be incorporated in the compact masses produced so as to render the compact masses incapable of flameless combustion. The flame retardant may be silica such as fine grain sand or any other non-combustible inert particulate component that serves to prevent the other constituents of the compact mass from bursting into flame during use. It is incorporated in the mixture to be compressed in an amount which will prevent the compact mass from bursting into flame during use but yet in an amount which will not prevent the uncombustible components, i.e. the fibrous material, from smoldering and being consumed by flameless combustion during use. The inert material also serves as a filter that aids in the retention of the shape of the compact mass.

The fibrous component derived from the green hickory wood may constitute a major weight portion of the finished briquette and typically constitutes between about fifty and about sixty-five percent of the weight of the compressed composition. The filter on the other hand is incorporated in amount between about fifteen and forty-five percent by weight in typical composition. Small amounts of starch or other binders may be incorporated in amounts sufficient to provide suitable adherence of the particles if desired, the binder usually constituting less than ten percent of the weight of the compacted mass.

In preparing the compact masses, as in briquette form, fresh extract is used as previously mentioned and the fibrous material is impregnated with the aqueous extract of essence material before the components are compressed. The amount of extract incorporated should be sufficient to provide the desired taste and aroma characteristics, effective amounts when the aqueous extract is derived from a treatment involving one part water (volume) and one part phloem (bulk volume) being usually between about one and ten percent by weight of the finished briquette.

In general, the compacted masses are prepared by forming an intimate admixture of particles that include particles of the untreated fibrous material derived from fresh hickory wood, particles of the phloem and also the binder where desired. The mass is then impregnated with the aqueous essence material and kneaded or stirred to form a damp mixture suitable for compacting, additional amounts of water being added if needed to provide a suitable consistency for the compacting step. Other procedures for mixing the various components of course may be followed also. The mass may be compacted into any suitable shape using suitable dies, etc.

One particular shape is shown in the drawing and consists of a solid cylindrical briquette 10 of the dried and compacted mass and which has a passageway 11 extending axially through the cylinder. The passageway opens at the opposite ends.

Once the mass has been compacted into the desired shape, it is permitted to air dry. In practice, it has been found that drying should also be accomplished at temperatures below 90° Fahrenheit for apparently a certain amount of aging is required after the mass is compacted and dried before the factors are rendered fully stable. In the preferred practice, a continuous stream of low temperature air, i.e. about 65° Fahrenheit, is passed over the briquettes after they have been removed from the dies until they provide an outward appearance of being dry.

Raw starch may be used as a binder and under such circumstances the fibrous material and starch are initially kneaded together with a small amount of water sufficient to dampen the components, and thereafter heated to a temperature of about 150° Fahrenheit. This causes the starch to become solubilized and thereafter upon cooling of the mass to a temperature below 90° Fahrenheit, the sand and extract may be intimately mixed with the cooled mixture. This mixture is then subjected to the briquetting step and the resultant briquette is thereafter dried at a temperature of less than 90° Fahrenheit. To avoid use of the heating step to solubilize the raw starch, a dry commercially pre-solubilized starch may be employed. Under such circumstances, all components may be intimately mixed together and slightly dampened if necessary with additional water to prepare the mix for the briquetting operation. Thereafter, material is compacted into a suitable briquette which is then followed by a drying step carried out in a temperature less than 90° Fahrenheit and preferably below 80° Fahrenheit.

The compacted masses containing the essence material are used as additives to charcoal burners and the like and are found to produce large volumes of smoke having the aroma of smoldering green hickory wood and which impart the full-bodied taste and aroma characteristics to meat products smoked thereby.

In practice the compacted masses are impregnated with water before addition to a bed of burning charcoal or the like. The water is vaporized, of course, as the additive is consumed but appears to better carry the essence material into the gaseous phase during use. In the case of a briquette such as that shown in the drawing having a height of 1½", a diameter of 2¾", and a circular passageway having a diameter of ⅜", and which has been compacted to ⅔ of the initial bulk volume of the mass subjected to the briquetting operation, submerging of the briquette in water for one minute before addition to the burner is adequate.

The following examples will serve to further illustrate the invention.

Example 1

An aqueous extract of essence material was prepared by first intimately mixing one part (volume) of water (60° F.) with one part (bulk volume) of ground phloem derived from a fresh cut hickory log and having a particle size comparable to that of coarse sawdust derived from a cross-cut saw. The mixture was allowed to stand at room temperature (about 65° Fahrenheit) for a period of about one hour to permit the fibers to become thoroughly impregnated and the essence material to become dissolved. Thereafter the aqueous component of the system was immediately separated from the insoluble phloem residue by a procedure that involved placing the mass in a closely woven cotton cloth container and then pressing the container and the residual material therein between rolls to express the residual liquid absorbed from the interstices of the insoluble residue and through the filter cloth.

The resultant liquid extract was collected and immediately employed in the preparation of a nonflammable smoke producing and combustible fuel additive as follows:

In preparing the fuel additive a mixture of fifty-nine parts (by weight) of fibrous particles derived from a fresh cut hickory log and six parts (by weight) of a commercial grade of raw cornstarch were intimately mixed with a sufficient amount of water to provide a mass which was damp to the touch. The fibrous particles had an average particle size of about 1/32 of an inch and consisted of a mixture of eighty percent (by weight) of fibrous material derived from the phloem component of the log and twenty percent (by weight) of fibrous material derived from the xylem component of the log. The dampened mass was heated to about 150° Fahrenheit in a steam heated vessel and with stirring was retained at this temperature until the mass became lumpy, thus evidencing solubilization of the starch component. Following solubilization of the starch the mass was permitted to cool to room temperature.

Once the mass had cooled, thirty parts (by weight) of fine beach sand and five parts (by weight) of the fresh aqueous extract prepared as indicated above were intimately mixed with the mass by stirring procedures. Thereafter the mass was transferred to the dies of a briquetting machine and briquettes of the kind shown in the drawing produced by compressing the mass to about ⅔ of its bulk volume with pressures of between about 20,000 and 30,000 p.s.i.

Immediately following the pressing step the briquettes were removed from the dies and dried by subjecting the briquettes to a stream of dry 60° air until the moisture was removed.

The briquettes were then used as a smoke producing fuel additive in the cooking of various meats wherein it was evident that the smoked meats embodied all the full-bodied flavor and aroma normally secured only by smoking such meats with water soaked green hickory logs.

In using the briquettes as a smoke producing fuel additive the briquettes were first soaked in water for a period of one minute before addition to the glowing charcoal used in the test. The pre-soaked briquettes were found to provide a voluminous amount of hickory smoke and rather than bursting into flame during use were consumed by flameless combustion.

Identical briquettes were prepared from the extract after the latter had been exposed to atmospheric conditions in an open container for a period of about forty-eight hours and were found upon testing to lack the taste and aroma imparting characteristics of the briquettes prepared through the use of freshly prepared extract.

Example 2

An extract rich in essence material may be prepared as indicated in accord with Example 1 and thereafter used as the extracting medium for extracting an equal volume of granulated phloem incurred with procedure followed in Example 1. The resulting extract in this case may be used to prepare briquettes as indicated in Example 1 and the briquettes thus prepared from the enriched extract will be found to produce a smoked meat product upon use having an even more enhanced hickory taste and aroma than found in the case of the briquettes prepared by the process indicated in Example 1.

Example 3

An essence rich aqueous extract may be prepared as follows:

A mass of particulate phloem having an average particle size of about 1/32 of an inch and derived from pulverizing green hickory feeder root stock is mixed with sufficient water to saturate the particles and then permitted to remain in the mixing vessel for a period of one and one-half hours. The amount of water used is approximately equal in volume to the bulk volume of the untreated mass of particulate phloem. The mass is maintained at about 65° Fahrenheit in the leaching system and following the soaking period is transferred to a cotton cloth bag and pressed to express the extract from the residual water insoluble components. The aqueous extract is then collected and used for preparing a fuel additive as follows.

In preparing the fuel additive the following are added to a mixing vessel and the particles intimately mixed to provide a mass suitable for impregnation with the essence extract:

| | Parts by weight |
|---|---|
| Fresh cut hickory phloem particles | 36 |
| Fresh cut hickory xylem particles | 25 |
| Fine beach sand | 30 |
| Presolubilized dry cornstarch | 6 |

The mixture is then impregnated with eight parts of the freshly prepared essence by adding the essence to the vessel and thoroughly stirring the mixture.

Briquettes of the kind shown in the drawing are then prepared as indicated in Example 1 and will be found upon use for smoking beef to impart the desired full-bodied aroma and flavor characteristics to the meat. During use the briquettes will be found to be nonflammable and to provide large volumes of smoke as they are consumed by flameless combustion.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A nonflammable, combustible product for use in the production of hickory smoked meats comprising a compacted mass adapted to retain its shape and which includes a mixture of particles having essence material derived from the phloem component of green hickory wood in intimate association therewith; said mixture comprising particles of untreated fibrous material derived from green hickory wood, and particles of inert, non-combustible material in intimate admixture with the particles of fibrous material; said inert, non-combustible material being present in an amount sufficient to render the compact mass nonflammable and insufficient to prevent combustion of the fibrous material.

2. A nonflammable combustible product for use in the production of hickory smoked meats in accord with claim 1, wherein said mixture includes starch and wherein said particles of inert, non-combustible material comprise silica granules.

3. A nonflammable combustible product for use in the production of hickory smoked meats in accord with claim 1 wherein the compacted mass has a solid cylindrical shape and is provided with a passageway extending axially of and through the compacted cylindrical mass.

References Cited

UNITED STATES PATENTS

| | | |
|---|---|---|
| 1,777,026 | 9/1930 | Alsberg. |
| 2,341,377 | 2/1944 | Hinderer _____ 44—15 |
| 2,916,365 | 12/1959 | Smith _____ 99—229 X |
| 3,106,473 | 10/1963 | Hollenbeck _____ 99—140 X |

HYMAN LORD, *Primary Examiner.*